United States Patent [19]

Zach et al.

[11] Patent Number: 4,727,965

[45] Date of Patent: Mar. 1, 1988

[54] GEARED HUB WITH FREEWHEEL, ESPECIALLY FOR WHEEL-CHAIRS

[75] Inventors: Wolfgang Zach, Bremen; Alfred Giesau, Stuhr, both of Fed. Rep. of Germany

[73] Assignee: Sanitatshaus Heinrich Oesterreich GmbH, Del.X

[21] Appl. No.: 757,835

[22] PCT Filed: Nov. 7, 1984

[86] PCT No.: PCT/EP84/00353

§ 371 Date: Jul. 8, 1985

§ 102(e) Date: Jul. 8, 1985

[87] PCT Pub. No.: WO85/02155

PCT Pub. Date: May 23, 1985

[30] Foreign Application Priority Data

Nov. 9, 1983 [DE] Fed. Rep. of Germany ....... 3340407

[51] Int. Cl.[4] .................. B62M 11/16; B62L 5/04; A61G 5/02; F16D 41/30

[52] U.S. Cl. .................. 192/6 A; 74/750 B; 74/781 B; 192/46

[58] Field of Search ............. 192/3.52, 6 A, 8 R, 192/12 B, 13 A, 46, 64; 74/781 B, 750 B; 280/242 WC

[56] References Cited

U.S. PATENT DOCUMENTS

| | | | |
|---|---|---|---|
| 3,134,274 | 5/1964 | Schwerdhofer | 192/6 A X |
| 3,438,283 | 4/1969 | Schwerdhofer | 74/781 B X |
| 3,563,568 | 2/1971 | Sasse et al. | 280/230 |
| 3,809,195 | 5/1974 | Schulz et al. | 74/750 B X |
| 4,147,243 | 4/1979 | Segawa et al. | 74/750 B X |
| 4,570,769 | 2/1986 | Isaka | 192/46 |

FOREIGN PATENT DOCUMENTS

| | | |
|---|---|---|
| 2159770 | 6/1973 | Fed. Rep. of Germany . |
| 2439332 | 2/1976 | Fed. Rep. of Germany . |
| 2514418 | 10/1976 | Fed. Rep. of Germany . |
| 2629836 | 1/1977 | Fed. Rep. of Germany . |
| 2556029 | 6/1977 | Fed. Rep. of Germany . |
| 2929138 | 2/1981 | Fed. Rep. of Germany . |
| 3241614 | 6/1983 | Fed. Rep. of Germany . |
| 326699 | 6/1903 | France . |
| 486400 | 3/1918 | France . |
| 514673 | 3/1921 | France . |
| 685706 | 7/1930 | France . |
| 2281847 | 3/1976 | France . |
| 226376 | 12/1924 | United Kingdom .......... 192/64 |
| 646836 | 11/1950 | United Kingdom .......... 192/64 |
| 1475629 | 6/1977 | United Kingdom . |

Primary Examiner—Rodney H. Bonck
Attorney, Agent, or Firm—Wolder, Gross & Yavner

[57] ABSTRACT

A geared hub for wheelchairs is specified, which besides at least one forward speed has an active hub brake and one reverse speed, and in which the braking and/or the reverse speed can be realized, from any of the forward speeds, through turning the driver backwards.

14 Claims, 4 Drawing Figures

GEARED HUB WITH FREEWHEEL, ESPECIALLY FOR WHEEL-CHAIRS

DESCRIPTION

The invention refers to a geared hub with a freewheel, especially for wheelchairs, containing: a hub axle and a driver supported on the hub axle, a hub sleeve supported at one side on the driver and at the other side on a rotatable lever-cone, where the lever-cone may be fastened to the frame of the vehicle by means of a brake lever, an epicyclic gear accommodated within the hub sleeve, a coupling sleeve connecting the driver to the ring gear or to the pinion cage of the epicyclic gear, a thread on the pinion cage, onto which a brake cone may be screwed axially and upon turning the driver backwards spreads a brake member against the hub sleeve, at least one first ratchet gear having spring-loaded pawls for the transmission of the driving torque introduced by the driver via the members of the epicyclic gear into the hub sleeve in the forwards direction of rotation.

From West German O/S No. 24 39 332, West German O/S No. 25 56 029, the West German Patent No. 21 59 770 and West German O/S No. 25 14 418 geared hubs of that kind are known. These known hubs are bicycle hubs and have a freewheel which enables the hub sleeve to be turned forwards freely relatively to the driver. Furthermore, these known hubs also have a back-pedal brake by means of which via a brake cone and a braking member braking forces are exerted from the inside upon the hub sleeve, when the driver gets turned back by a predetermined amount relatively to the hub axle fastened to the vehicle frame, until the brake is applied. The epicyclic gear serves in the case of the known geared hubs for realizing different gear ratios between the driver and the hub sleeve. Through axial shifting of the coupling sleeve which acts between the driver and the members of the epicyclic gear or respectively through axial shifting of the members of the epicyclic gear the different gear ratios may, in a known manner, be selectively produced.

This known hub is unsuitable for incorporation into wheelchairs since, corresponding with its application to bicycles, it does not allow driving the hub sleeve in the backwards direction. Furthermore, these known hubs all have unblocking mechanisms which ensure release of the brake under all circumstances. In order to make this possible, these unblocking mechanisms produce a relatively large rotary play of from 20° to 40° in the forwards direction between the driver and the hub sleeve. This rotary play ensures that, with the backpedal brake fully braked, the brake cone is first withdrawn and the braking member thereby released, and that only after that does the ratchet gear acting between the driver and the hub sleeve take the hub sleeve with it again solidly in the forwards direction. Due to the construction this rotary play between the driver and the hub sleeve also exists in the case of the known hubs when the driver is to drive the previously freewheeling hub sleeve once again in the forwards direction via the corresponding ratchet gear.

Since the known hubs do not allow any driving in the backwards direction and since furthermore a rotary play of about 20° to 40° must always be overcome, if the driver wants to exert upon the previously freewheeling hub sleeve a driving torque, this known hub cannot be used in wheelchairs.

From West German O/S No. 26 29 839 a special wheelchair hub is further known which has a freewheel mechanism. From West German O/S No. 32 41 614 a wheelchair is likewise known which can be actuated by means of a hand lever and has a freewheel coupling. The hubs of these known wheelchairs do not have any change-speed gearing and furthermore have no active brake which can be actuated by the driver.

From West German O/S No. 29 29 138 a wheelchair is again known, which has a hub with a gear which, by selection, enables reversal of the direction of rotation and furthermore exhibits gear ratios which may be selected. This known hub likewise has no backpedal brake which can be activated by the driver.

By comparison, the problem of the invention is to develop a geared hub of the kind specified initially, further in such a way that a simple drive in the forwards and in the backwards directions is possible without essential rotary play or angular backlash between the driver and the hub sleeve.

In the case of the geared hub of the kind specified initially this problem is solved in accordance with the invention by there being provided between the brake member and the brake lever or respectively the frame of the vehicle a second ratchet gear which freewheels if a torque in the backwards direction of rotation is transmitted from the driver via the coupling sleeve, the members of the epicyclic gear, the brake cone and the spread brake member to the hub sleeve.

If in the case of the hub, in accordance with the invention, the driver is turned back, relatively to the fixed hub axle, the pinion cage, via the coupling sleeve and the epicyclic gear, likewise gets turned back, whereupon the brake cone travels along its thread axially towards the bake member and spreads the brake member against the hub sleeve and thereby brakes the hub sleeve. The braked rest position of the hub sleeve is thereby reached. If, from this braked position the dirver is now turned further in the backwards direction the driver, via the coupling sleeve and the epcicyclic gear and via the frictional connection of the activated brake, carries the hub sleeve with it in the backwards direction because now the second ratchet gear freewheels so that at least that part of the lever cone against which the brake member bears, can turn with it in the backwards direction.

Thus, the hub, in accordance with the invention, makes it possible through turning backwards the driver which in the case of a wheelchair is connected solidly to the handwheel rims, first to trigger the backpedal brake, to bring the hub sleeve thereby to a standstill, and subsequently through further turning backwards to take the hub sleeve along in the backwards direction via the frictional connection of the activated brake. A wheelchair equipped with this hub can, therefore, be driven by the handwheel rim in the forwards direction, in which case a freewheel is provided between the hub sleeve/running wheel and the driver/handwheel. The backpedal brake may be activated during forwards motion or at standstill of the wheelchair. Through further turning of the driver backwards a backwards rotation of the hub sleeve/running wheel then takes place.

If the hub sleeve gets braked from a forwards rotation, as a rule, heavy braking forces act between the hub sleeve and the spread braking member. If by chance upon reaching standstill just one pawl of the first ratchet gear now catches in the associated set of teeth, the strain imposed in the case of the known geared hubs upon the hub sleeve, the first ratchet gear, the members of the epicyclic gear, the brake cone and the brake member, which there may be eliminated only through additional unblocking mechanisms and corresponding angle of backlash/rotary play, is effectively avoided in accordance with the invention through the fact that the driver may be turned back beyond the fully braked position. That is, upon turning the driver backwards again from standstill the pawls of the first ratchet gear are turned because of the gear ratio of the epicyclic gear more rapidly in the backwards direction than the hub sleeve which via the frictional engagement of the brake is coupled firmly to the pinion cage. Thus, in accordance with the invention, upon turning the driver back, starting from standstill, the first ratchet gear freewheels and through this freewheeling prevents the strain upon or blocking of the brake.

Additional unblocking mechanisms which in the case of any forwards turning or forwards driving motion of the driver effected relatively to the hub sleeve create a large angle of backlash/rotary play and which, in the case of application in a wheelchair, would convert the available driving movement of the hands essentially into the angle of backlash/rotary play, can therefore be dispensed with. In accordance with the invention, on the contrary, for the first ratchet gear a particularly small tooth pitch t and/or a relatively larte number of pawls may be arranged at differing spacing in order to limit the forwards angle of backlash preferably to a value between about 1° and 6°. The user of a wheelchair who is driving his wheelchair via the hub in accordance with the invention by means of a handwheel rim fastened to the driver, therefore has available for driving the wheelchair essentially the whole angle of rotation which can be covered each time he takes a fresh grip.

The lever cone is advantageously subdivided into an outer part which can be fixed to the frame of the wheelchair by means of the brake lever, and an inner rotatable part. The second ratchet gear is arranged between the outer and inner parts of the lever cone.

Alternatively, the second ratchet gear may also be inserted between the lever cone and the brake lever or respectively the frame of the vehicle. On the outside of the endface of the lever cone a gearwheel is then mounted, which cooperates with a spring-loaded pawl which is fastened to the brake lever and couples the brake cone to the brake lever when torques are exerted upon the brake cone because of a braking procedure. In the backwards direction of rotation, on the contrary, the brake cone throws out of the pawl and freewheels.

It is particularly preferable that the first ratchet gear be arranged between the ring gear of the epicyclic gear and the inner circumference of the hub sleeve. For reduction of the angle of backlash of the first ratchet gear a suitable number of spring-loaded pawls is fitted on the outer circumference of the ring gear of the epicyclic gear. Preferably, the circumferential spacing of the pawls from one another is unequal to a multiple of the pitch t of the associated toothed ring, whereby the angle of backlash is further reduced because, of course, the individual pawls at any instant are lying in different relative positions with respect to the teeth of the toothed ring. Thus, while one pawl must still cover the maximum angle of backlash until engagement in the next tooth, another pawl or respectively another group of pawls is nearer the point of engagement. In order to achieve this action the pawls may also have circumferential spacings which differ from one another.

It is particularly preferable that the geared hub be provided with gear ratios which may be selected. For this purpose, the coupling sleeve which acts between the driver and the members of the epicyclic gear is made able to shift axially and in a first position connects the driver to the ring gear (normal speed) and in a second position connects the driver to the pinion cage (high speed). Furthermore, a third ratchet gear may be provided, which is arranged on the pinion cage and serves for the realization of a third speed (hill speed) if, via the change speed mechanism, the first ratchet gear is put out of action through axial shifting.

In accordance with the invention the geared hub is built into wheelchairs which have a frame and at least two running wheels at the sides and one handwheel each for driving the running wheels. The axle of the hub and the brake lever are fastened to the frame of the wheelchair so as to be unable to turn. The running wheels are fastened to the hub sleeve, and the handwheel rims to the driver.

Embodiments of the invention are explained in greater detail below with the aid of the drawings, wherein.

Figure 1:
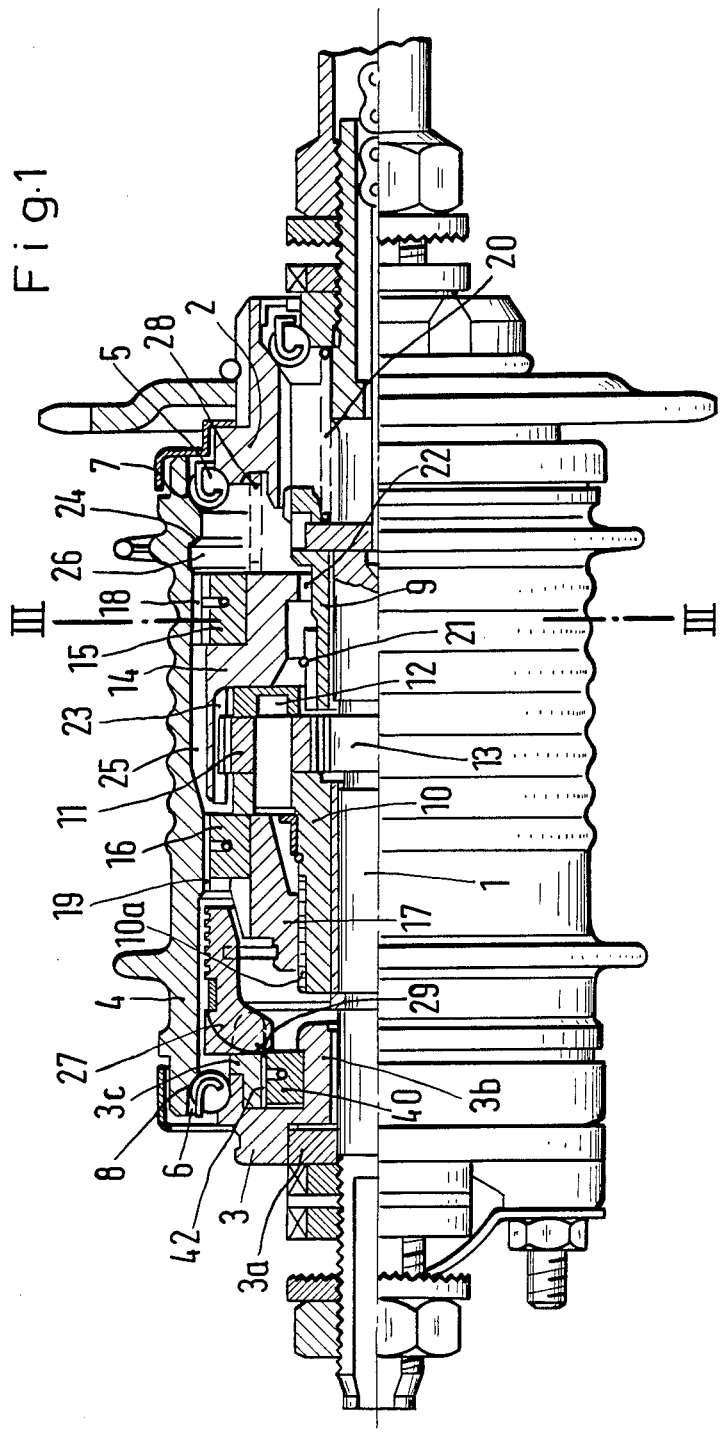
FIG. 1 is a geared hub in accordance with the invention, half-sectioned longitudinally.

On a fixed hub axle 1 are arranged on one side a driver 2 and on the other side a lever cone 3, upon which a hub sleeve 4 is supported to be able to rotate by means of ball bearings 5 and 6 respectively.

The driver 2 can via a permanently coupled axially displaceable sleeve-shaped coupling member 9 which in turn exhibits external sets of coupling teeth of various diameters, be connected at option to a pinion cage 10 exhibiting internal teeth or to the ring gear 14 of the epicyclic gear 10–14. The epicyclic gear comprises, moreover, apart from the pinion cage 10 which is able to turn on the hub axle 1, planet pinions 11 on axles 12 on the pinion cage, a sun wheel 13 fixed in rotation onto the hub axle 1 as well as the ring gear 14 which is constantly in engagement with the planet pinions 11. On the sleeve-shaped shank of the pinion cage 10 a thread is arranged upon which a brake cone 17 is fitted to be able to screw axially, which upon turning the driver backwards shifts a brake member 27 axially towards the lever cone 3 and then spreads it outwards and forces it against the hub sleeve 4.

As a freewheel between the ring gear 14 and the hub sleeve 4 a first ratchet gear 15, 18 is fitted, which carries on a pawl wheel 15 pawls 15c which are spring-loaded against an inner toothed ring 18 and catch in the internal set of teeth 18 for the transmission of the driving torque acting in the forwards direction of rotation, introduced by the driver 2 via the epicyclic gear 10–14.

There is further provided a third ratchet gear 16, 19 the pawl of which is arranged on the brake cone 17, from which spring-loaded pawls can engage in a set of internal teeth 19 in the hub 4 if a driving torque is to be transmitted in the forwards direction of rotation.

The geared hub illustrated has three different gear ratios which may be switched in at option and are also designated "speeds". In FIG. 1, the switching position "high speed" is illustrated, in which via the coupling sleeve 9 which is supported to be able to rotate and to shift axially on the hub axle 1, the driver 2 is connected to the pinion cage 10 which is able to rotate on the hub axle 1, so that in turn the pinion cage 10 drives via the planet pinions 11 the ring gear 14, that is, at higher r.p.m. so that the ratchet gear 15 on the ring gear 14 drives the hub sleeve via the internal set of teeth 18, while the ratchet gear 16 lying on the slower turning brake cone 17 on the shank of the pinion cage 10 does not come into engagement with the associated internal set of teeth 19 in the hub sleeve 4 because the latter in consequence of being driven via the faster running ring gear 14 revolves faster and for the ratchet gear 16 a freewheeling state thereby arises.

Upon appropriate shifting of the coupling sleeve 9 towards the right in the Figure, via a thrustblock not designated more precisely and by switching rod and switching pullchain in the hollow-drilled hub axle, 1, the driving connection of the driver 2 via the coupling sleeve 9 to the pinion cage 10 is removed and instead of it the ring gear 14 is driven by the coupling sleeve 9 through engagement of the set of coupling teeth on the coupling sleeve 9 with the set of internal teeth 22 in the ring gear 14. The driving connection now goes from the driver 2 via the coupling sleeve 9 directly into the ring gear 14 which in turn by the ratchet gear 15, 18 drives the hub sleeve 4 in "normal speed".

The third possible switching position of the embodiment, that of the "hill speed" is obtained by the coupling sleeve 9 being shifted on the hub axle 1 still further towards the right by means of the aforesaid switching pull members, that is, against the resilience of a compression spring 20 into the bore in the driver 2. By this axial shifting of the coupling sleeve 9 the ring gear 14 too is at the same time shifted axially against a compression spring 28 because a circlip 21 arranged to give a contracting grip on the coupling sleeve 9 strikes against the set of internal coupling teeth 22 on the ring gear 14 and then shifts the latter likewise towards the right in the Figure by the same amount of axial shift of the coupling sleeve 9. During this axial shifting of the ring gear 14 the engagement with the pinions 11 is preserved so that the pinion cage 10 may still be driven by the driver 2 via the coupling sleeve 9 and the directly coupled ring gear 14, but the pawls of the ratchet gear 15 on the ring gear 14 get brought out of engagement with the set of internal teeth 18 on the hub sleeve 4 by the pawls 14 upon axial shifting of the ring gear 14 towards the right, coming into the range of a taper ring 24 the diameter of which in the hub sleeve decreases towards the right. The pawls of the ratchet gear 15 thereby get pressed radially inwards and thereby come out of engagement with the set of internal teeth 18. The transmission of the forwards driving torque is effected by the ring gear 14 which is driven only via the pinion cage 10 which is now turning slower and in turn drives the brake cone 17 with the pawls of the ratchet gear 16 lying on it, which now produces the connection to the hub sleeve 4 and drives the latter at slow speed.

The pinion cage 10 has on the end of it directed towards the lever cone 3 a thread 10a upon which the brake cone 17 is supported to be able to be screwed or shifted axially and acts by a taper face against a brake member 27 when the driver 2 via the coupling sleeve 9 and if necessary the ring gear 14 turns the pinion cage 10 in the backwards direction relatively to the hub axle.

The brake member 27 thereby, upon turning the driver 2 backwards, comes with simultaneous bearing against the lever cone 3 into frictional engagement with the hub sleeve 4 which thereby gets braked.

Between the brake member 27 and the brake lever 3a or respectively the frame of the vehicle a further ratchet gear 40, 42 is provided, which freewheels when a torque in the backwards direction is exerted upon the brake member 27. For this purpose, in the embodiment illustrated in FIG. 1, the lever cone 3 is subdivided into an outer part 3b which may be fastened via the brake lever 3a to the frame of the vehicle, and a rotatable inner part 3c which includes the bearing area for the brake member 27. The ratchet gear 40, 42 has a pawl wheel 42 on the outer part 3b of the lever cone, which carries pawls which are spring-loaded against a set of internal teeth on the part 3c and freewheel when the rotatable inner part 3c of the lever cone experiences, via the brake member 27, the brake cone 17, the pinion cage 10, the coupling sleeve 9 and the driver 2, a torque in the backwards direction. If, on the other hand, upon braking the hub sleeve 4 running in the forwards direction, a torque in the forwards direction is exerted via the brake member 27 upon the part 3c of the lever cone 3, the ratchet gear 40, 42 couples the part 3c solidly to the part 3b of the lever cone 3, which is fastened to the frame of the vehicle. The part 3c of the lever cone and the brake member 27 are coupled together by means of a coupling member 29 to be unable to twist apart.

Figure 2:
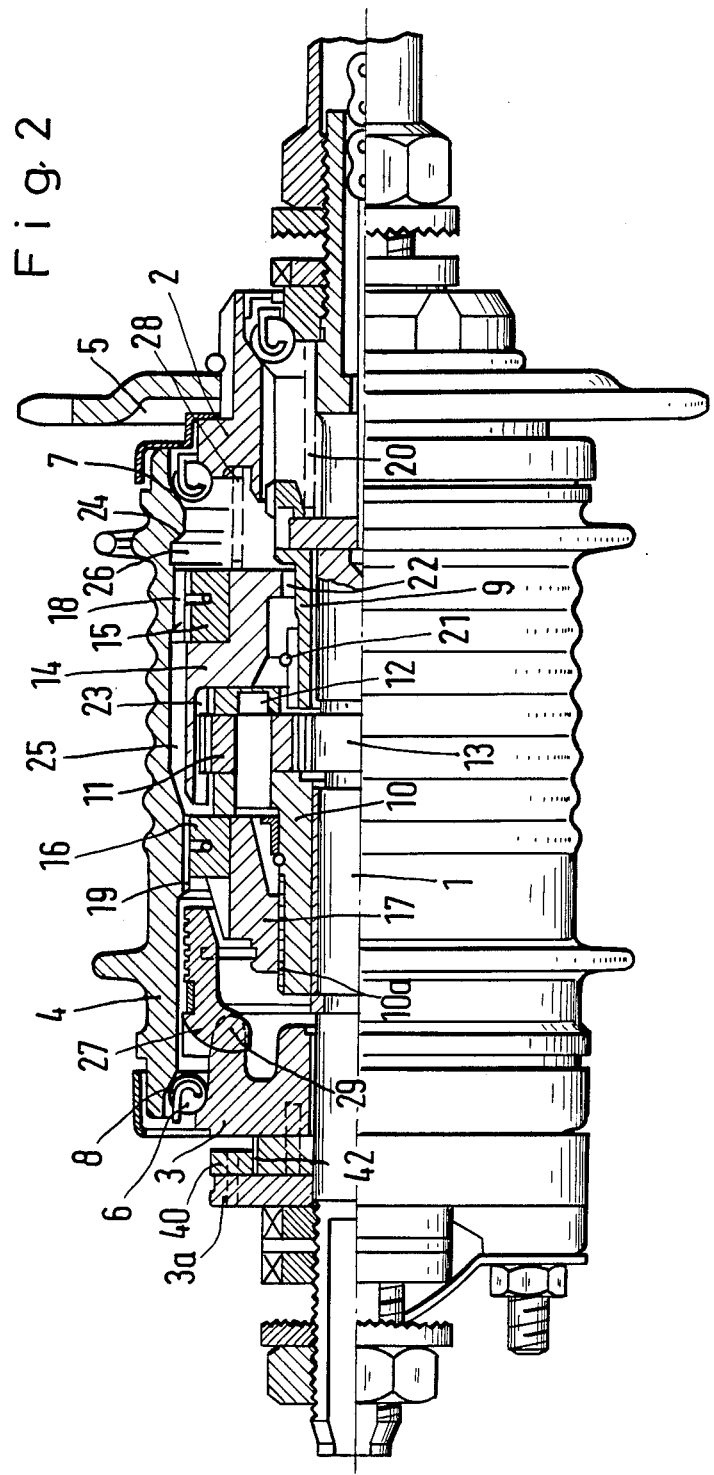
FIG. 2 is a second embodiment of the invention, in section.

In accordance with the embodiment of the invention illustrated in FIG. 2, the ratchet gear 40, 42 is arranged between the brake lever 3a and the brake cone 3 which is made in one piece. To the outer endface of the lever cone 3 is fatened a toothed ring 42 which cooperates with a spring-loaded pawl 40 which is fastened to the brake lever 3a. The ratchet gear 40, 42 freewheels when a torque in the backwards direction is introduced from the driver 2 via the spread brake member 27, but on the other hand, it is blocked when, from the hub sleeve 4 turning in the forwards direction, a torque is introduced in the forwards direction from the activated brake member 27. The brake member 27 is coupled by means of the coupling member 29 to the lever cone 3 so that they cannot twist apart.

Hence, both the transmission hub in accordance with FIG. 1 and also that in accordance with FIG. 2 have a number of forward speeds, an active hub brake which may be activated by turning the driver backwards (backpedal brake) and a reverse speed in which the ratchet gears 15, 18 and 16, 19 freewheel and the drive is effected from the driver 2 via the coupling sleeve 9, the epicyclic gear 10-14, the brake cone 17, and the brake member 27 via a frictional connection to the hub sleeve 4, the backwards rotation only becoming possible because the further ratchet gear 40, 42 then likewise freewheels.

Figure 3:
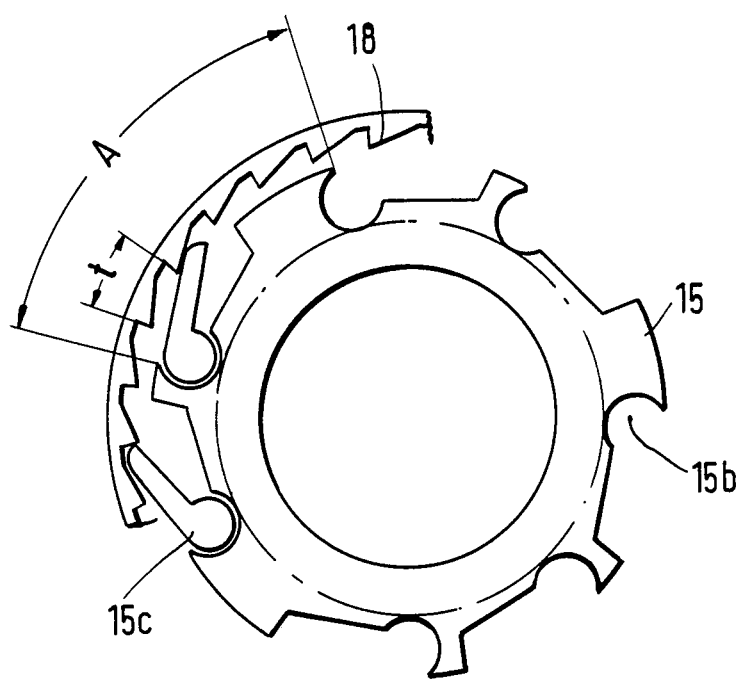
FIG. 3 is a section along the line III—III of FIG. 1.
Figure 4:
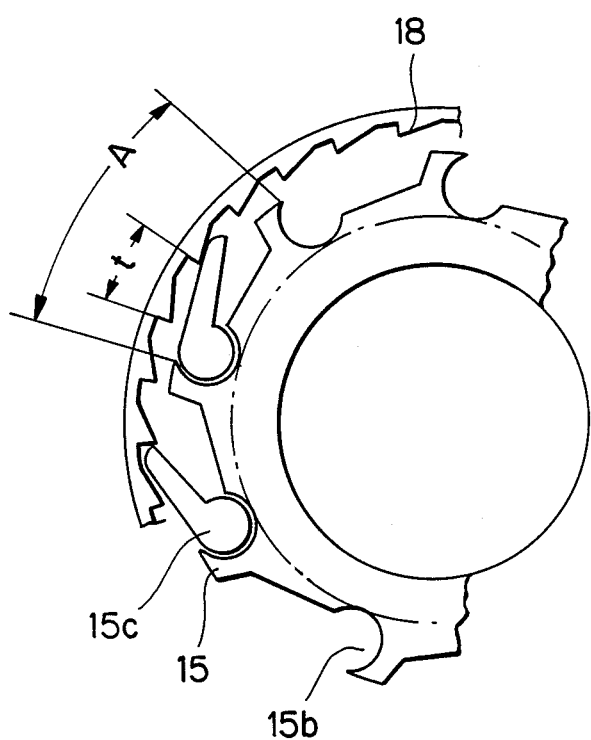
FIG. 4 is a second embodiment of the pawl wheel of FIG. 3.

FIG. 3 shows an embodiment of the pawl wheel 15 or 16 of the ratchet gears 15, 18 and 16, 19 respectively. In the embodiment shown the pawl seats 15b which receive the pawls 15c are arranged at differing spacings from one another. The angle of backlash which must be covered until the engagement of a pawl 15c in one of the teeth of the set of internal teeth 18 is thereby reduced. Alternatively, the pawls 15c may be arranged equidistantly round the circumference, as shown in FIG. 4, in which case the number of teeth in the set of internal teeth 18 and the number of pawls 15c is so chosen that the spacings A of the pawls from one another is unequal to a multiple of the pitch t of the set of internal teeth, i.e., that the equation to apply is A nt, where n=1, 2, 3 ....

If at any time two pawls lying opposite one another are always to come simultaneously into engagement with the set of of internal teeth 18, the corresponding pairs of pawls are to be correspondingly offset respectively from adjacent pairs of pawls.

FIGS. 1 to 3 show geared hubs having three different gear ratios which may be set at option through switching members. But, alternatively, the geared hub for use in wheelchairs may also be executed with merely one gear ratio of fixed setting. In this case, the driver 2 may be connected solidly via the coupling sleeve 9 to the pinion cage 10 or the ring gear 14. The driver 2, coupling sleeve 9 and pinion cage 10 or respectively ring gear 14 may then also be made in one piece. The ratchet gear 16, 19 may then be omitted.

If the geared hubs in accordance with the invention are built into wheelchairs, as a rule, two hubs are arranged in axial alignment at a predetermined distance apart on the frame of the wheelchair with a wheelchair seat between them. The hub axle 1 is bolted solidly to the frame and running wheels are fastened onto the hub sleeves 4 on opposite sides of the wheelchair seat. On each of the drivers 2 is seated a handwheel rim having a diameter which is reduced as compared with the running wheels in order to be able to drive the running wheels by hand. Wheelchairs of that kind have one or more forward speeds, a hub brake which, without having to release the handwheel rims, may be actuated through turning the handwheel rims backwards, and a reverse speed which is realized upon turning the handwheel rim backwards out of a forwards motion or standstill of the wheelchair after activation of hub brake. Hence, the user, without having to release the handwheel rims, can execute all of the desired operations. In particular, an effective braking of the forward motion is possible and the user can furthermore change over from a forward motion through an effective braking process directly into a backward motion or from a backward motion or respectively from standstill into a forward motion without a very large angle of backlash. And the user can, in particular, also perform a forward movement without noticeable angle of backlash between the handwheel rims and the running wheel, whereby the angular rotation covered by hand at any time is converted fully into a length of path covered.

What is claimed is:

1. A geared hub with a freewheel adapted for use with a wheelchair vehicle having a frame by which the hub is supported, containing:
   a hub axle and a driver supported on the hub axle;
   a hub sleeve supported at one side on the driver and at the other side on a rotatable lever-cone, said lever-cone being mounted to the frame of the vehicle;
   an epicyclic gear having a pinion cage accommodated within the hub sleeve, a ring gear, a planet pinion and a braked sun gear;
   a coupling sleeve adapted to connect the driver alternatively to the ring gear or to the pinion cage of the epicyclic gear;
   a thread on the pinion cage having a brake cone screwed axially thereon which, upon turning the driver backwards, spreads a brake member against the hub sleeve;
   at least one first ratchet gear having a ratchet wheel and spring-loaded pawls for the transmission of the driving torque introduced by the driver via the epicyclic gear into the hub sleeve in the forward direction of rotation;
   characterized by a second ratchet gear between the brake member and the frame of the vehicle, said second ratchet gear adapted to freewheel when a torque in the backwards direction of rotation is transmitted from the driver via the coupling sleeve, the epicyclic gear, the brake cone and the spread brake member to the hub sleeve.

2. The hub of claim 1 wherein said lever-cone is mounted to said frame by a brake lever.

3. The hub of claim 2 wherein said second ratchet gear is provided between said lever-cone and said brake lever.

4. A geared hub as in claim 1 or 3, characterized in that the brake member (27)
   is supported to be able to shift axially towards the lever cone (3) and is coupled to be unable to twist with respect to at least one freewheeling part of the lever cone (3), which through the second ratchet gear (40, 42) can freewheel in the backwards direction of rotation.

5. A geared hub as in claim 3, characterized in that the lever cone (3)
   is subdivided into an outer part (3b) which can be fixed to the frame of the vehicle by means of the brake lever (3a) and an inner part (3c) able to freewheel, and that the second ratchet gear (40, 42) is arranged between the outer and inner parts (3b, 3c) of the lever cone.

6. A gear hub as in claim 3, characterized in that the lever cone (3) includes on its endface a toothed ring (42) and the brake lever (3a) includes a spring-loaded pawl mounted for engagement with said toothed ring, whereby in the case of a torque acting in the forward direction the lever cone (3) is coupled solidly to the brake lever (3a) and in the case of a torque in the backwards direction of rotation lever cone (3) is allowed to freewheel.

7. A geared hub as in claims 2 or 3, characterized in that the first ratchet gear is arranged between the ring gear (14) of the epicyclic gear (10-14) and the inner circumference of the hub sleeve (4).

8. A geared hub as in claim 1 or 3, characterized in that the spring-loaded pawls of the first ratchet gear (15, 18) have the same circumferential spacing (A) from one another.

9. A geared hub as in claim 8, characterized in that the circumferential spacing (A) of the pawls (15c) of the first ratchet gear (15, 18) is unequal to a multiple of the pitch (t) of the associated internal teeth (18) of the first ratchet gear (15, 18).

10. A geared hub as in claim 1 or 3, characterized in that the pawls (15c) of the first ratchet gear (15, 18) have spacings (A) which differ from one another.

11. A geared hub as in claim 10, characterized in that the pawls (15c) of the first ratchet gear have in pairs spacings which differ from one another.

12. A geared hub as in claim 1 or 3, characterized in that the coupling sleeve (9) for the realization of a number of forward speeds is supported to be able to shift axially on the hub axle (1) in a first position to couple the driver (2) to the ring gear (14) and in a second position to couple the driver to the pinion cage (10) of the epicyclic gear (10-14).

13. A geared hub as in claim 1 or 3, characterized in that the ring gear (14) together with the ratchet wheel (15) of the first ratchet gear can be put out of engagement with the hub sleeve by being able to shift axially, and that a third ratchet gear (16, 19) is arranged between the brake cone (17) and the inner circumference of the hub sleeve (4) and serves for the transmission of the forward driving torque introduced by the driver (2) via the pinion cage (10) into the hub sleeve (4), when the first ratchet gear (15, 18) is out of engagement.

14. A geared hub as in claim 1 or 3, characterized in that the coupling sleeve (9) has a first end fixed to rotate with the driver (2).

* * * * *